(12) United States Patent
Lundström et al.

(10) Patent No.: US 10,669,608 B2
(45) Date of Patent: Jun. 2, 2020

(54) PROCESS FOR RECOVERING GOLD

(71) Applicant: OUTOTEC (FINLAND) OY, Espoo (FI)

(72) Inventors: Mari Lundström, Helsinki (FI); John O'Callaghan, Victoria (AU); Timo Haakana, Espoo (FI); Riina Ahtiainen, Pori (FI); Janne Karonen, Kokemäki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 249 days.

(21) Appl. No.: 15/521,790

(22) PCT Filed: Oct. 29, 2015

(86) PCT No.: PCT/FI2015/050749
§ 371 (c)(1),
(2) Date: Apr. 25, 2017

(87) PCT Pub. No.: WO2016/066905
PCT Pub. Date: May 6, 2016

(65) Prior Publication Data
US 2017/0247777 A1    Aug. 31, 2017

(30) Foreign Application Priority Data

Oct. 29, 2014    (FI) .................................... 20145949

(51) Int. Cl.
*C22B 11/06*    (2006.01)
*C22B 3/24*    (2006.01)
(Continued)

(52) U.S. Cl.
CPC ............... *C22B 11/06* (2013.01); *C22B 3/10* (2013.01); *C22B 3/24* (2013.01); *C22B 3/42* (2013.01); *C22B 11/04* (2013.01); *Y02P 10/234* (2015.11)

(58) Field of Classification Search
CPC .... C22B 3/10; C22B 3/24; C22B 3/44; C22B 11/04; C22B 11/06; C22B 3/42
See application file for complete search history.

(56) References Cited

U.S. PATENT DOCUMENTS 4,049,444 A    9/1977 Bell et al.
4,144,056 A    3/1979 Kruesi
(Continued)

FOREIGN PATENT DOCUMENTS

AU    2013200572 B2    8/2013
AU    2013316588 B2    3/2014
(Continued)

OTHER PUBLICATIONS

"Leach." Merriam-Webster, Merriam-Webster, Apr. 25, 2009, www.merriam-webster.com/dictionary/leach. https://www.merriam-webster.com/dictionary/leach Accessed Jul. 2, 2019. (Year: 2009).*
(Continued)

*Primary Examiner* — Tima M. McGuthry-Banks
(74) *Attorney, Agent, or Firm* — Buchanan Ingersoll & Rooney PC

(57) ABSTRACT

Provided is a process for recovery of gold from gold-bearing raw materials comprising (a) leaching said gold-bearing raw material in a chloride containing leaching solution containing a total concentration of less than 120 g/L of halide ions, whereby the total concentration of chloride ions is less than 120 g/L of to dissolve gold and to obtain a leach solution comprising gold in solution; and simultaneously contacting the leach solution comprising gold in solution with a re-
(Continued)

sorptive material to obtain a leach solution comprising gold-bearing re-sorptive material; and (b) recovering gold and optionally silver from the said gold-bearing re-sorptive material.

16 Claims, 7 Drawing Sheets

(51) Int. Cl.
C22B 3/00 (2006.01)
C22B 3/10 (2006.01)
C22B 3/42 (2006.01)

(56) References Cited

U.S. PATENT DOCUMENTS

| | | | | |
|---|---|---|---|---|
| 4,551,213 A | * | 11/1985 | Wilson | C22B 11/04 |
| | | | | 205/566 |
| 4,723,998 A | * | 2/1988 | O'Neil | C22B 11/06 |
| | | | | 210/684 |
| 4,734,270 A | | 3/1988 | Touro et al. | |
| 5,328,669 A | * | 7/1994 | Han | C22B 7/008 |
| | | | | 423/22 |
| 5,571,308 A | | 11/1996 | Duyvesteyn et al. | |
| 6,428,599 B1 | | 8/2002 | Cashman | |
| 2002/0152845 A1 | * | 10/2002 | Fleming | C22B 3/08 |
| | | | | 75/732 |
| 2009/0241735 A1 | | 10/2009 | Abe et al. | |
| 2009/0241736 A1 | | 10/2009 | Abe et al. | |

FOREIGN PATENT DOCUMENTS

| | | | | |
|---|---|---|---|---|
| CA | 2884363 A1 | * | 3/2014 | C22B 3/10 |
| CN | 1653197 A | | 8/2005 | |
| CN | 1732277 A | | 2/2006 | |
| CN | 103572068 A | | 2/2014 | |
| EP | 1457577 A1 | | 9/2004 | |
| FR | 2424963 A1 | | 11/1979 | |
| GB | 1008196 A | | 10/1965 | |
| JP | S50-105506 A | | 8/1975 | |
| OA | 06316 A | | 6/1981 | |
| RU | 2423534 C2 | | 7/2011 | |
| WO | 2014/156350 A1 | | 10/2014 | |

OTHER PUBLICATIONS

"7681-52-9(Sodium hypochlorite) Production Description." Chemical Book. https://www.chemicalbook.com/ChemicalProductProperty_US_CB1705333.aspx (Year: 2017).*
"Potassium hypochlorite solution." Safety Data Sheet. https://www.denora.com. (Year: 2014).*
"Sulfuric Acid." The National Institute for Occupational Safety and Health (NIOSH). Centers for Disease Control and Prevention (CDC). https://www.cdc.gov/niosh/npg/npgd0577.html. Updated 2019. (Year: 1999).*
Examination Report issued by the Australian Patent Office in corresponding Australian Patent Application No. 2015340424 dated Feb. 9, 2018 (6 pages).
International Search Report (PCT/ISA/210) dated Jan. 21, 2016, by the European Patent Office as the International Searching Authority for International Application No. PCT/FI2015/050749.
Written Opinion (PCT/ISA/237) dated Jan. 21, 2016, by the European Patent Office as the International Searching Authority for International Application No. PCT/FI2015/050749.
International Preliminary Report on Patentability (Chapter II of the Patent Cooperation Treaty) (PCT Article 36 and Rule 70) (Form PCT/IPEA/409) dated Oct. 24, 2016, by the European Patent Office for International Application No. PCT/SE2014/050518.
Yazici, E. et al., "Recovery of metals from chloride leach solutions of waste of printed circuit boards by adsorption and precipitation", XXVII International Mineral Processing Congress, pp. 170-179, Oct. 23, 2014. XP055240154.
Patent Search Report issued by the Russian Patent Office in corresponding Russian Patent Application No. 2017116165/02 dated Mar. 14, 2018 (2 pages).
Search Report issued by the State Intellectual Property Office of the People's Republic of China in corresponding Chinese Patent Application No. 201580058089.X dated Jun. 20, 2018 (2 pages).

* cited by examiner

PROCESS FOR RECOVERING GOLD

FIELD OF THE INVENTION

The present invention relates to a process of recovering gold, and more particularly to recovery of gold from gold-bearing ores and concentrates. The exemplary and non-limiting embodiments relate generally to recovering gold, and more particularly to a method for recovering gold during leaching from gold-containing material.

BACKGROUND OF THE INVENTION

Gold may be produced hydrometallurgically using cyanide leaching or hydrochloric acid leaching. Gold ores, concentrates, oxidation residues and calcines are almost exclusively subjected to cyanide leaching with carbon in leach, carbon in pulp, or cyanide leaching followed by gold cementation using zinc (Merrill-Crowe process). Hydrochloric acid leaching with high acidity and high redox potential is mainly applied for secondary raw materials including high concentrations of platinum-group metals (PGM), such as anode slimes. At present, there is a negligible amount of industrial scale cyanide free gold processes for gold ores, concentrates, oxidation residues, calcines or low grade secondary raw materials.

Already in the 19th century, gold was leached by using chlorine gas. By using chlorine gas, the redox potential of a leach solution may be increased and gold dissolved from the raw material as a gold chloride complex. One of the major issues at that time was gold precipitation on production equipment materials, e.g. on the rotating wooden barrel. Sometimes at the end of the leaching plant/equipment lifetime, the barrels were burnt to recover gold. There were attempts to prevent that phenomena e.g. by tar on the wooden surface. This tendency (also referred to as preg-robbing, resorption, solution depletion) of the gold chloride complex to precipitate/reduce back to the raw material or other material present in the process has caused problems when developing chloride processes.

Development stage gold chloride leaching processes generally use high concentrations of chloride, typically with a bromide addition and an oxidant (such as $Cu^{2+}$) present. This is in order to dissolve gold and to keep gold stable in the solution. It is generally accepted that decreased chloride concentration has a negative impact on gold leaching kinetics. However, high chloride and bromide concentrations may cause high operating costs such as increased amount of wash water or increased loss of chemicals to the bleed and/or leach residue and increasingly complex chemistry in the process.

For example AU2008202814 discloses a method for recovering gold and other precious metals using halide solutions.

AU201320205 discloses a method of eluating gold and silver comprising leaching gold and silver using acidic leachate which includes chloride ions and/or bromide ions as anions and copper and iron as cations from sulphide ore bearding cold and silver to the acidic leachate by heating; absorbing at least the gold and silver in the acidic leachate on activated carbon and eluting gold and silver on activated carbon on which at least the gold and silver are adsorbed by using an aqueous thiosulfate solution that is maintained at less than pH 7. The sequential method of AU201320205 does not appear to allow recovery of gold from preg-robbing raw materials.

One of the problems associated with the methods disclosed in AU2008202814 and AU201320205 is that high halide concentrations (e.g. chloride or bromide) are required resulting in requirement to clean all process waters bled from the process before they can be released to the environment and increase process chemical cost, industrial water and optionally evaporation cost.

BRIEF DESCRIPTION OF THE INVENTION

An object is thus to provide a method so as to alleviate the above disadvantages. The objects are achieved by a method which is characterized by what is stated in the independent claims. Preferred embodiments are disclosed in the dependent claims.

The invention is based on the surprising realization that leaching solution having a low chloride concentration can be utilized in leaching of gold-bearing raw materials in mild conditions with high gold recovery rate when the process parameters are adjusted in a particular manner. Apart from possible neutralization, the process waters bled from the process require only minor purification prior to release into environment.

Accordingly provided herein is a process for recovering gold from gold-bearing raw material. The method comprises contacting the gold-containing material with a leach solution containing chloride ions for leaching gold from the gold-containing material into the leach solution, and wherein the leach solution containing gold is contacted with re-sorptive material for recovering gold from the leach solution.

An advantage of the method is that a more environmentally friendly method for leaching gold is obtained, as the leaching can be carried out milder process conditions (in lower concentrations of chloride, cupric and/or ferric ions) and the use of substances such as bromide and cyanide can be avoided. Further advantage of the method of the invention is that chloride containing aqueous solutions, e.g. seawater, naturally available at the site of the leaching facility can be directly or using only minor chemical addition (such as sodium chloride/calcium chloride) utilized in gold recovery thus saving operating costs and simplifying the overall process.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
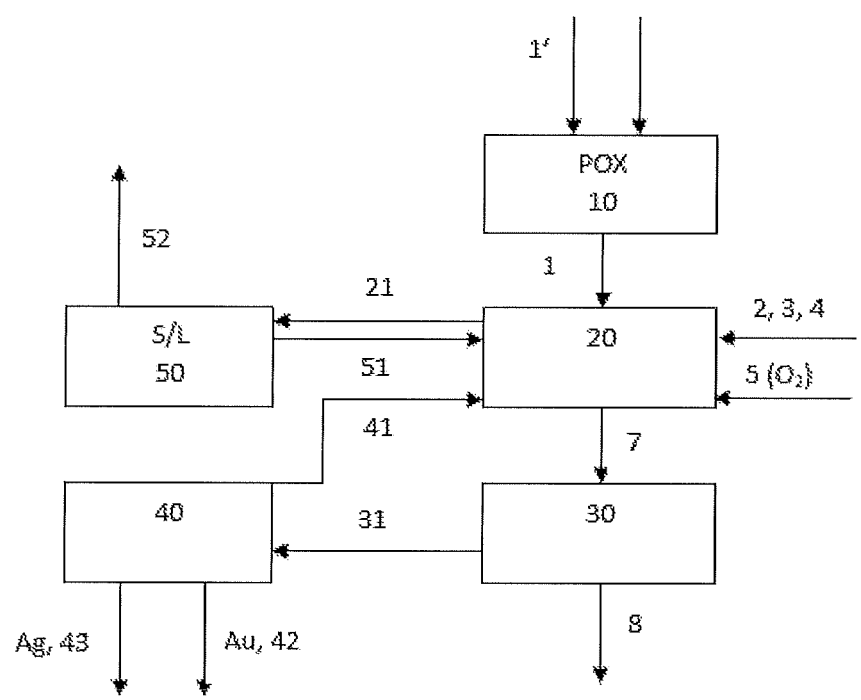
FIG. 1 shows a flow diagram of a gold recovery process illustrating a first example of the invention.

The present invention provides a process for recovery of gold from gold-bearing raw materials. The process comprises (a) leaching said gold-bearing raw material in a chloride containing leaching solution comprising a total concentration of less than 120 g/L of halide ions, whereby the total concentration of chloride ions is less than 120 g/L of, to dissolve gold and to obtain a leach solution comprising gold in solution; and simultaneously contacting the leach solution comprising gold in solution with a re-sorptive material to obtain a leach solution comprising gold-bearing re-sorptive material; and (b) recovering gold and optionally silver from the said gold-bearing re-sorptive material.

In particular the present invention provides a process for recovery of gold from gold-bearing raw materials. The process comprises (a) leaching said gold-bearing raw material in a chloride containing leaching solution comprising a total concentration of less than 50 g/L of halide ions, whereby the total concentration of chloride ions is less than 50 g/L, the total concentration bromide ions is less than 10 g/L, and a total concentration of cupric and/or ferric ions of at least 0.26 g/L, to dissolve gold and to obtain a leach solution comprising gold in solution; and simultaneously contacting the leach solution comprising gold in solution with a re-sorptive material to obtain a leach solution comprising gold-bearing re-sorptive material; and (b) recovering gold and optionally silver from the said gold-bearing re-sorptive material.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All words and expressions should be interpreted broadly and they are intended to illustrate, not to restrict, the embodiment.

The gold chloride complex is not as stable as, for example, a gold bromide complex or a gold cyanide complex. Usually, a low redox potential, absence of bromide, and low chloride concentrations in the leach solution lead to slower gold dissolution and/or to gold reduction/precipitation on the raw material/equipment surfaces, etc. Despite this conventional understanding, the present invention provides a method where gold may be recovered in an environment where gold is less stable in solution by using a mild chloride leaching environment even in the absence of bromide by providing a competitive reduction/adsorption/absorption matter (see Examples 1 and 5 below).

In the present process stability of the gold chloride complex in the leach solution is not required, but gold is captured on a re-sorptive matter immediately when exposed to the leach solution. This allows the use of lower chloride concentrations, lower oxidant concentrations, i.e. lower iron and/or copper and/or other oxidant concentrations, and lower redox potentials, as well the use of preg-robbing raw-materials (see Example 4 below). In an exemplary embodiment, gold in a material having a tendency to precipitate gold in the solution (referred as preg-robbing material) may be leached and recovered. In an exemplary embodiment, a lower chemical consumption and lower capex and opex are achievable. In an exemplary embodiment, the process is totally cyanide free. These features make the process more environmentally friendly and more applicable for several raw materials.

The process of the present invention is accordingly suitable for free-milling and/or pre-oxidized non-free milling gold-bearing raw materials. The said raw material may be preg-robbing, but does not need to. The term "preg-robbing" as used herein and hereafter refers to re-deposition, reduction, and/or adsorption of gold dissolved from the host material onto the preg-robbing matter surface, e.g. amorphous carbon surface of the materials and thus to its loss from solution and remaining with the gangue and/or the leach residue. The term "preg-robbing raw material" further refers to the presence of preg-robbing material, such as carbonaceous amorphous, graphitic carbon, other carbonaceous matter, clay or other adsorption/reducing component, or any mixtures thereof, in said raw material. Said raw material typically comprises at least 0.01% w/w, in particular at least 0.5% w/w, preferably at least 1% w/w, preg-robbing matter, that decreases gold recovery, of the total weight of the raw material.

In accordance with the present invention the gold-bearing raw material, when not free-milling, is preferably pre-oxidized before the leaching step (a) by any of the following: roasting, pressure oxidation, and bio-oxidation such as bacterial oxidation or by any combinations thereof. If desired also the free-milling gold-bearing raw material may be pre-oxidized before the leaching step (a). The said raw material may for example be ore, concentrate, tailings, roaster calcine, oxidation residue, leaching residue, leaching intermediate, secondary raw material, waste material, gravity concentrate, sulfide concentrate, waste of electrical and electronic equipment (WEEE) scrap or other free-milling material, or any mixture thereof.

FIG. 1 shows an example of a process flow of a gold recovery process. Gold-bearing raw material (1) is fed into a gold leaching step (20) wherein the raw material (1) is leached under atmospheric or slightly pressurized conditions in the presence of a re-sorptive material (2) which is able to capture, e.g. absorb, reduce, and/or precipitate, dissolved gold from leaching solution. If raw material comprising non-free-milling matter is treated, the said raw material (1') is first subjected to a pre-oxidation step (10), e.g. pressure oxidation (POX), as discussed above, to obtain a free-milling gold-bearing raw material (1).

Leaching (20) may be performed under total pressure consisting of hydrostatic and atmospheric pressure. Optionally small over-pressure can be used. Typically at the top of the reactor the over-pressure is less than 0.5 bar. In particular hydrostatic pressure can be utilized to increase dissolution kinetics. Preferably the leaching step (a) is performed under atmospheric conditions. The temperature of the leaching step (a) is at or below the boiling point of the leaching solution, advantageously from 70 to 105° C., preferably from 90 to 100° C. The temperature of the leaching step (a) may locally rise above the boiling point of the leaching solution due to hydrostatic pressure.

Leaching is performed in a leaching solution (2) which comprises chloride ions.

The total halide concentration of the leaching solution is less than 120 g/L, for example from 50 to 100 g/L, alternatively less than 50 g/L, in particular less than 40 g/L, preferably from 1 to 35 g/L, more preferably from 2 to 30, even more preferably from 10 to 20 g/L. The total chloride concentration of the leaching solution is less than 120 g/L, for example from 50 to 100 g/L, alternatively less than 50 g/L, in particular less than 40 g/L, preferably from 1 to 35 g/L, more preferably from 2 to 30, even more preferably from 10 to 20 g/L.

In an example of the present invention, the chloride for gold complexation is provided as a salt solution (e.g. NaCl or $CaCl_2$) or received from some other chloride source. In accordance with a preferred example of the present invention the leaching solution comprises chloride containing aqueous solution available at the site of the leaching facility. Accordingly the total chloride concentration of the leaching solution may vary depending on the nature of the chloride containing aqueous solution. The said chloride containing aqueous solution available at the site of the leaching facility may for example be a chloride solution originating from chloride chemicals, sea water, a chloride containing aqueous bleed produced within the leaching facility, or any mixture thereof. For example the chloride content of sea water varies depending on the geological location. As said the said chloride ions are typically contained in the leaching solution autogenously, however the said chloride ions may alternatively or additionally be provided into the leaching solution for example in the form of chloride salt or salt containing solution, such as sodium chloride (NaCl), calcium chloride ($CaCl_2$), cupric chloride ($CuCl_2$), ferric chloride ($FeCl_3$), or any mixture thereof. In a particular example of the present invention the leaching solution is or is derived from sea water. In an alternative example the leaching solution is a synthetic aqueous chloride solution.

In some prior art gold leaching processes bromide ions are added to the solution to retain gold more stable as a gold bromide complex. With the method of the present invention, it is not necessary to add bromide ions to the leaching solution. However, their presence in the leaching step is tolerated. In a preferred example of the present invention the leaching step (a) 10 is performed in the absence of added bromide ions. Typically the concentration of bromide ions in the chloride containing leaching solution is less than 10 g/L, more preferably from 0 to 5 g/L, most preferably 0 g/L.

pH in the leaching step (a) is preferably kept below the precipitation limit for cupric and/or ferric. Typically pH is less than 4.0, preferably less than 2.7, more preferably equal to or less than 1. In an example of the present process pH is from 1 to 4, preferably from 1 to 1.5, in order to further keep cupric and ferric or cupric soluble. pHs up to 4.0 may be used, since atacamite/cupric precipitation pH increases with decreasing chloride concentration. The HCl concentration may be less than 40 g/L, preferably less than 12 g/L, more preferably less than 10 g/L. pH does not remarkably affect the gold dissolution kinetics. However, high pH is advantageous in presence of impurities as at higher pH the impurity level in solution is smaller, amount of chloride bound to impurity complexes is smaller and resultantly the bleed can be smaller. The present process is also able to operate at high acidity (HCl~10 g/L), whereas in prior art processes the ferric ion activity for gold dissolution decreases at high acidity.

At high acidity (HCl~10 g/L), ferric and/or cupric ions may be used as an oxidant. At higher pHs (>1.5) iron precipitates, and low cupric concentration may be used as an oxidant. An exemplary embodiment is primarily suitable for free gold leaching, e.g. free-milling ore, roaster calcine, oxidation residues, leaching residues, secondary raw materials, gravity concentrates, and/or sulphide concentrates.

The redox potential of the leaching solution in the leaching step (a) is adjusted to the level where gold will dissolve. The oxidizing conditions are typically achieved by the presence of an oxidizing agent, typically cupric and/or ferric ions (3). Said cupric ions are typically provided into the leaching solution in form of copper salts e.g. $CuSO_4$ and/or $CuCl_2$ or they originate from the raw material. $CuCl_2$ may be advantageous in cases where the autogenous chloride concentration of the chloride containing aqueous solution available at the site of the leaching facility is extremely low and the amount of chloride ions must be adjusted to a higher concentration. Preferably the said cupric and/or ferric ions are provided in the form of corresponding sulfate salts i.e. $CuSO_4$ and/or $FeSO_4$. A feed of an oxygen containing gas (5), such as oxygen, air or oxygen enriched air, is additionally provided to keep typically cupric and/or ferric oxidized.

The total concentration of dissolved cupric and/or ferric ions in the chloride containing leaching solution is at least 0.26 g/L, preferably at least 1 g/L, more preferably at least 3 g/L, even more preferably from 5 to 45 g/L, most preferably from 9 to 20 g/L. No strong oxidants such as hydrogen peroxide, nitric acid or chlorine gas are required in the leaching step of the present invention. In an aspect of the present invention presence of copper ions is not necessarily required, not even in the raw material. This is due to the fact that ferric/ferrous redox potential increases with decreasing chloride ion concentration. Preferably the total concentration of ferric ions in the chloride containing leaching solution is 0 g/L to 10 g/L, more preferably 0.26 g/L to 5 g/L. Further preferably the total concentration of cupric ions in the chloride containing leaching solution is less than 20 g/L, more preferably less than 5 g/L, even more preferably less than 1 g/L, most preferably 0 g/L. In an exemplary embodiment, leaching is carried out in the absence of iron. In an exemplary embodiment, leaching is carried out in the absence of copper.

In an exemplary embodiment, gold is leached in a ferric chloride solution, wherein primary gold oxidation is carried out by means of ferric (III) iron $Fe^{3+}$. An initial leaching solution composition comprises a small concentration of $Fe^{3+}$, a moderate Cl concentration, no Br, and no $Cu^{2+}$, i.e. an environment where gold is relatively unstable in the solution. Gold leaching is enabled by recovering gold instantaneously during the leaching on activated carbon or other re-sorptive material (see Example 1 below).

The redox potential of the leaching solution in the chloride leaching step (a) is adjusted to the level where gold dissolves, typically to at least 400 mV vs. Ag/AgCl, preferably above 450 mV vs. Ag/AgCl, in particular above 500 mV vs. Ag/AgCl. With the present process the redox potential is typically be kept below 600 mV vs Ag/AgCl, preferably even below 530 mV vs. Ag/AgCl. In particular the redox potential is from 450 to 530 mV vs. Ag/AgCl.

In accordance with the present invention the leaching step (a) is performed in the presence of a re-sorptive material (4) which is able to capture, e.g. absorb, absorb, reduce and/or precipitate dissolved gold from the leaching solution. The presence of a re-sorptive material is required due to the fact that gold chloride complexes likely have a very low stability in the leaching conditions and need to be recovered as soon as possible on the re-sorptive material. Otherwise gold will precipitate back on the raw material, materials of construction or other surface, even in the absence of preg-robbing material in the said raw material.

During leaching, the re-sorptive material may be arranged to reside e.g. on the walls of the leach reactor, or the re-sorptive material (4) may be in the leach solution in the form of particles, ion-exchange resin, and/or random packing, for example.

Typically the re-sorptive material (4) is selected from carbon comprising chemicals and materials, preferably from a group consisting of activated carbon, resin, organic solvents, organic substances such as wood, coal and fibre, inorganic carbon, rubber, plastics, biopolymers, and any combinations thereof. For example the re-sorptive material comprises one or more of activated carbon, resin in leach, solvent in leach, organic substance, inorganic carbon, rubber, plastic, ion-exchange resin and polymeric resin.

In an exemplary embodiment, gold is reduced on carbon in chloride leach, i.e. CICL. In Example 1 below it is shown that from less stable solutions (i.e. solutions where the gold chloride complex is instable) the recovery may be carried out instantaneously, wherein CICL or resin in chloride leach (RICL) or a corresponding method may be used as the gold recovery method. The use of CICL is advantageous due to the fact that it allows the use of lower reagent concentrations, lower redox potentials and the use of preg-robbing feed materials and process equipment in the chloride leaching (see Example 4 below).

Figure 4:
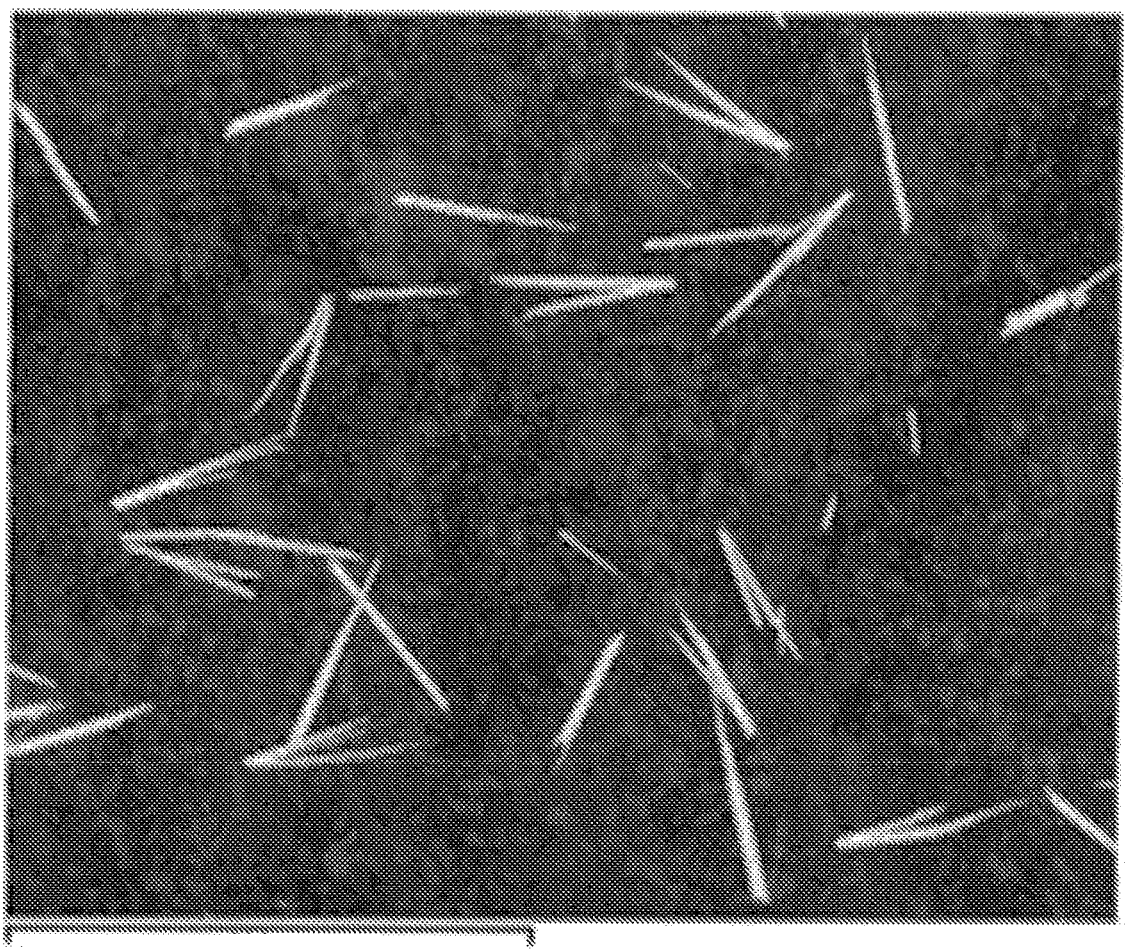
FIG. 4 shows a microscopic view of gold precipitated on bromobutyl rubber.

In a typical example of the present invention the re-sorptive material (4) is activated carbon. The advantage of activated carbon is the high area for adsorption/reduction/precipitation, high affinity for gold in chloride media, good availability and low price compared to many other sorbents. Activated carbon (active carbon, activated charcoal, activated coal) is a form of carbon processed such that low-volume pores increase the surface area available for adsorption or chemical reactions. Activated carbon has a high degree of microporosity, providing a desired activation level. In addition to activated carbon, suitable re-sorptive materials to be used in an exemplary embodiment include e.g. resin in leach, solvent in leach, organic substance (e.g. wood), inorganic carbon, rubber, plastic, ion-exchange resin, and/or polymeric resin. FIG. 4 shows a microscopic view of gold precipitated on bromobutyl rubber.

In another example of the present invention the re-sorptive material (4) is a plastic such as a polymer resin. An example of a polymer resin suitable for recovery of gold is a gold selective resin such as a polystyrene resin. In such a polystyrene resin gold is adsorbed onto solid spherical polystyrene resin beads rather than activated carbon grains. Another example of suitable ion exchange resin includes resins comprising piperazine functionalities.

The amount of the re-sorptive material (4) added to the leaching solution (2) is dependent on the amount of gold to be recovered and/or concentration of preg-robbing material in the gold-bearing raw material and/or the gold dissolution rate. Preferably the concentration of the re-sorptive material (4) is at least 5 g/L, preferably at least 10 g/L, more preferably 20 to 80 g/L in the leaching solution.

With reference to FIG. 1, the gold-bearing re-sorptive material (7) is subjected to gold recovery step (b) (30) for recovery of gold from the said re-sorptive material. Gold can be recovered from the gold-bearing re-sorptive material (7) by known methods. Gold may be recovered from the re-sorptive material (7) for example pyrometallurgically, by elution, by stripping, or by leaching gold from the pyrometallurgically received ash.

Preferably gold is recovered from the gold-bearing re-sorptive material (7) pyrometallurgically. Pyrometallurgical recovery of gold from the gold-bearing re-sorptive material is typically achieved by burning the gold-bearing re-sorptive material to obtain in a gold (and optionally silver) rich dore (8). The resulting burned re-sorptive material (31) may optionally be leached or eluted (40) to ensure full recovery of gold (42) and silver (43). Copper (41) recovered by the optional leaching or elution step (40) may be recycled to the chloride leaching step (a) (20) for provision of cupric ions (4) required in said leaching step (a) (20).

The gold-depleted leach solution (21) resulting from the gold leaching step (a) (20) may be subjected to solid-liquid separation (50) to separate leach residue (52) form the solution and to obtain a leach effluent (51). The leach effluent (51) can be recycled directly back to the leaching step (a) (20) or first treated to recover the source of cupric and/or ferric ions from the said leach effluent (51) by e.g. precipitation. The copper-depleted leach effluent can then be released to the environment e.g. back to the sea and the precipitated copper and/or iron can be dissolved and recycled to the leaching step (a) (20).

Silver may be simultaneously partly or totally recovered (see Example 2 below). Alternatively or in addition to that, silver may be recovered by precipitating (e.g. by sulfidization), reducing, cementing (e.g. by copper), solvent extraction, ion exchange or some other suitable method from the re-sorptive material (and/or from the leach solution).

Impurities may be reduced/adsorbed/absorbed/precipitated on re-sorptive material as well. Gold recovery from carbon may be carried out pyrometallurgically. An Au—Ag dore is obtained. Impurities may end up to the Au—Ag dore, be eluted from the carbon, or be eluted from burned carbon, i.e. ash. Instead of or in addition to carbon, some alternative re-sorptive material may be used in the leach, e.g. resin in leach, solvent in leach, organic substance (e.g. wood), inorganic carbon (e.g. clay), rubber, plastic, ion-exchange resin, and/or polymeric resin.

In an exemplary process, gold may be leached in a moderate chloride solution. Ferric ions may be used as a primary oxidant. In an exemplary process, no Br and no or minor $Cu^{2+}$ is needed for gold oxidation or stabilization. An exemplary process may involve about 0-10 g/L of $Fe^{3+}$, preferably about 0.26-5 g/L; less than 120 g/L of $Cl^-$, preferably about 50-100 g/L; copper ($Cu^{2+}$) less than 20 g/L, preferably less than 5 g/L, more preferably less than 1 g/L; a temperature of 75° C. to boiling point of the leach solution, preferably 90° C.; pH below a ferric and/or cupric precipitation limits, but HCl concentration even as high as 10 g/L.

In these conditions, a gold chloride complex is considered less stable in the leach solution. For that reason, gold chloride leaching has traditionally been carried out at higher redox potentials, having higher cupric, chloride and bromide concentrations in the solution. In an exemplary embodiment, simultaneous presence of re-sorptive material, such as activated carbon, makes the gold recovery possible at the leach solution (see Example 1 below).

In an exemplary embodiment, gold may be leached at lower chloride concentrations compared to existing gold chloride leaching processes. Low chloride concentration increases the pH limit above which $Cu^{2+}$/atacamite precipitation occurs. For that reason, $Cu^{2+}$ is in an aqueous form and able to oxidize gold also at higher pHs. An exemplary process may be applied even when pH=4 with low chloride concentrations.

In an exemplary process, the gold present in the raw material (also referred to as gold-bearing raw material) is leached in a single stage (optionally with a low concentration of trivalent iron (III) and oxygen-containing gas (e.g. air/oxygen/oxygen-enriched air)) in a chloride media. Optionally low concentration of divalent copper (II) may be used. The oxidation-reduction potential (redox potential) may be 400 mV to 750 mV vs. an Ag/AgCl reference electrode, preferably 500 mV to 620 mV, more preferably 500 mV to 550 mV. pH is below the cupric and/or ferric precipitation limit, and a HCl concentration of the magnitude [HCl]=10 g/L or even higher may be used. For example, the leach solution may have an HCl concentration of 5 g/L to 40 g/L, preferably 10 g/L to 12 g/L, more preferably 10 g/L. No other strong oxidizing reagents, such as hydrogen peroxide or nitric acid, are needed. The gold obtained in the solution during leaching is reduced/adsorbed/absorbed/precipitated simultaneously in the leaching stage on activated carbon or other suitable re-sorptive material for gold. Silver, if present, may be leached in the presence of excess chloride and recovered simultaneously by means of carbon. Alternatively or in addition to that, silver may afterwards be precipitated or extracted by other means, e.g. by SX.

An exemplary process installation may include a) a leaching and gold recovery unit, b) an activated carbon burning unit and/or an optional elution unit (or a precipitant/reductant/adsorbent/absorbent treatment unit), c) a solid liquid separation unit, d) a circulation unit, e) an evaporation unit (the process solution may be balanced e.g. by means of evaporation to remove excess water from the leach solution), and d) an impurity treatment unit.

An exemplary embodiment involves a closed chemical circulation, wherein water balance is handled by evaporation and/or by reverse osmosis (RO) and/or some other water removal technology, such that there is no bleed or only minimal bleed to the environment.

In an exemplary embodiment, after gold (and silver) has been separated from the leach solution, there is a solid/liquid separation stage. The solution is circulated in the process and excess water may be removed by evaporation and/or some other suitable water removal technology. Impurities, if accumulated, may be subjected to appropriate waste water treatment to minimize environmental impact.

As the presence of copper and bromide is not required, no recovery for copper or bromide needs to be arranged. However, in an exemplary embodiment the leach solution may contain copper (added or from the raw material), wherein appropriate recovery and/or circulation of copper may be arranged.

EXAMPLES

Example 1

Au extraction in gold leaching conditions. The chloride leaching conditions for gold was tested with a free-milling ore. Table 1 (test parameters) below and FIG. 1 (gold extraction) show that gold recoveries of the high magnitude (>90%) may be achieved in less stable solutions without bromide in the solution based on a solid analysis during the experiments listed in Table 1 (ferric or cupric leaching conditions).

Test 1: Test 1 was a "reference test" carried out in a conventional oxidative leaching environment keeping gold stable in the solution (high [Cl], [Br] and [Cu], similar to Intec or some other development stage chloride leaching processes). The gold recovery rate was 91%.

Figure 2:
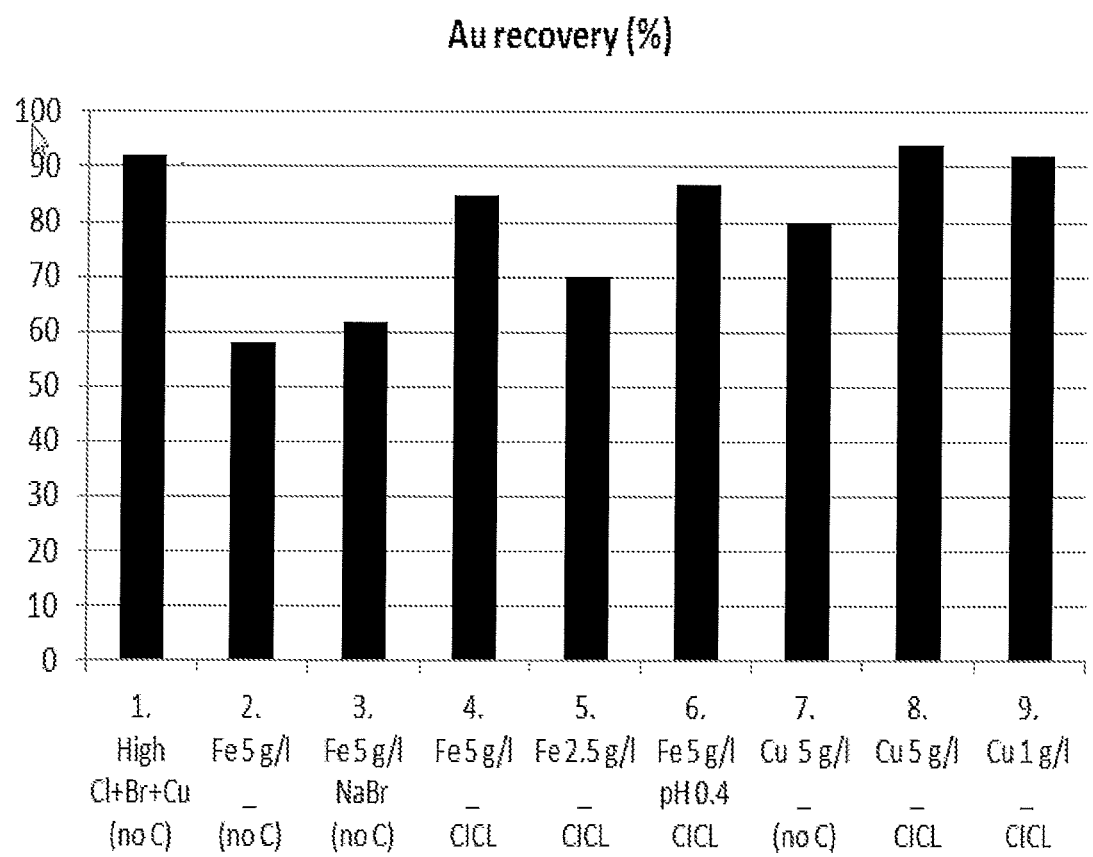
FIG. 2 illustrates gold extraction rates obtained in ferric or cupric leaching environments for a particular ore.

Tests 2, 3 and 7: Using low concentrations of ferric or cupric ions in the solution (in the absence of carbon and bromide), gold extraction rate was lower and varied between 58-80% (tests 2 and 7, Table 1 and FIG. 2). This is due to the gold chloride complex instability at lower redox potentials. Addition of NaBr to ferric leach (in the absence of carbon, test 3, Table 1, FIG. 2) improved gold recovery slightly from 58% to 62%.

Test 4: Gold CICL ferric leach with $[Fe^{3+}]$=5 g/L in the absence of bromide and cupric gave promising ~85% Au extraction (FIG. 1, see test 4). This shows that by using a reductive matter (i.e. activated carbon), gold may be leached and recovered also in a less oxidative environment.

Test 5: Lower ferric concentration in CICL (2.5 g/L of $[Fe^{3+}]$ in test 5, Table 1, FIG. 2) showed lower gold recoveries (~70%) compared to test 4, but higher recoveries compared to tests 2 and 3 without CICL.

Test 6: Lower acidity (test 6, Table 1, FIG. 2) gave gold recovery (~87%) of the same level with higher acidity (test 4, Table 1, FIG. 2), showing that the acidity did not decrease ferric ion activity but the leaching is efficient at both high and lower acidity.

Tests 8-9: It was shown that CICL cupric leach with $[Cu^{2+}]$=5 g/L or $[Cu^{2+}]$=1 g/L (test 8 and 9, Table 1, FIG. 2) gave very good gold recoveries of >90%.

Additionally, it may be suggested that with counter current mode of carbon gold recovery may most probably be increased to a higher level.

TABLE 1

Initial leaching test parameters for free-milling gold concentrate

| Test | Re-sorptive material | $Cu^{2+}$, g/L | $Fe^{3+}$, g/L | $Cl^-_{tot}$, g/L | NaBr, g/L | Acid conc., g/L | t, h |
|---|---|---|---|---|---|---|---|
| 1 (ref) | no C | 15 | — | 150 | 8 | 10 | 10 |
| 2 (ref) | no C | — | 5 | 100 | — | 10 | 30 |
| 3 (ref) | no C | — | 5 | 100 | 8 | 10 | 30 |
| 4 | CICL | — | 5 | 100 | — | 10 | 30 |
| 5 | CICL | — | 2.5 | 100 | — | 10 | 30 |
| 6 | CICL | — | 5 | 100 | — | pH = 0.4 | 30 |
| 7 (ref) | no C | 5 | — | 100 | — | 10 | 30 |
| 8 | CICL | 5 | — | 100 | — | 10 | 30 |
| 9 | CICL | 1 | — | 100 | — | 10 | 30 |

Example 2

Au and Ag recovery on carbon. Example 2 shows that gold may be recovered on carbon. Silver may be at least partially recovered in an exemplary leaching process; however, the recovery of silver was not very high. Based on the same experimental parameters shown in Example 1 (Table 1), gold recovery in the ferric chloride leaching having carbon in leach (test 4 (Fe 5 g/L, CICL) was 85% (based on solid analysis) and 89% (based on carbon analysis). This is a bit lower than in the "strong" chloride leaching without carbon (92%). Silver extraction in ferric chloride leach with CICL was 53% (based on residue analysis) and 29% (based on carbon analysis). This is of the same magnitude as in the "strong" chloride leach (test 1 (high Cl+Br+Cu), Table 1, FIG. 2) without carbon (56%).

TABLE 2

Au and Ag recovery on carbon in tests

| | Extraction to carbon, % | | | |
|---|---|---|---|---|
| | Based on residue | | Based on carbon | |
| Test | Au | Ag | Au | Ag |
| 1 (high Cl + Br + Cu) | 92.0 | 56.3 | — | — |
| 4 (Fe 5 g/L, CICL) | 84.6 | 53.4 | 88.7 | 28.8 |

Example 3

In an exemplary leaching process, the ferric ion is a strong oxidant. With higher Cl concentrations the redox potential of $Fe^{2+}/Fe^{3+}$ decreases, making $Cu^{2+}$ the main and strongest oxidant in the solution, which is the reason copper is the main oxidant present in prior art gold leaching processes. In an exemplary leaching process the presence of copper is not necessary (it should be noted, however, that in a real life situation there is often some copper present e.g. due to the raw material used).

Example 4

Figure 3:
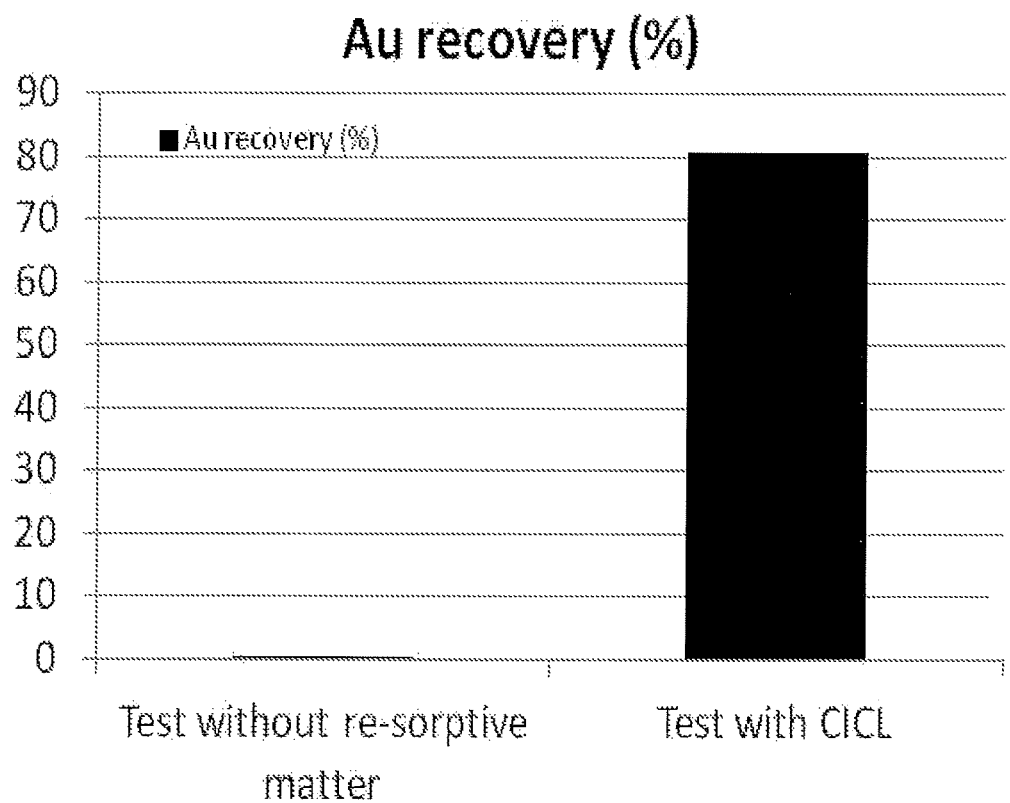
FIG. 3 illustrates gold extraction rates obtained with and without re-sorptive materials.
Figure 5:
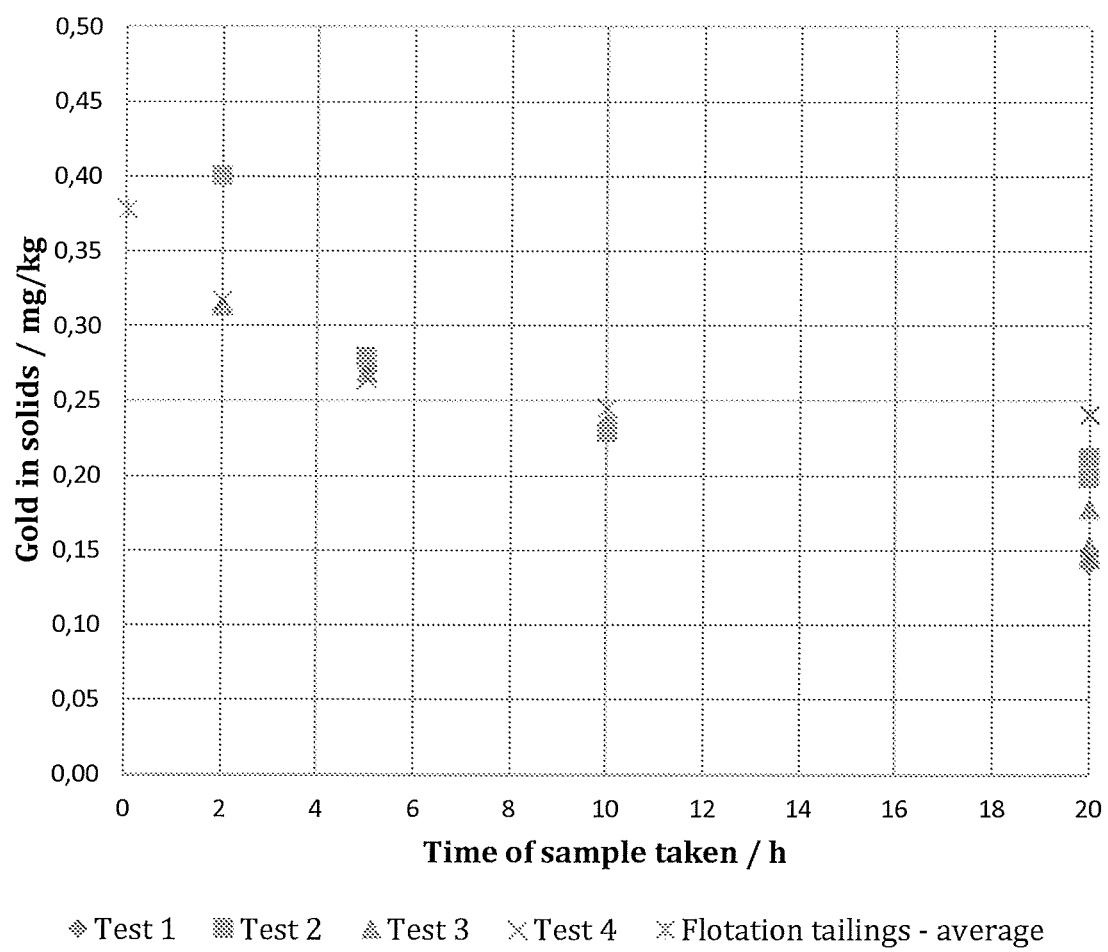
FIG. 5 illustrates obtained gold extraction rates in low chloride environment.

A gold leaching test was carried out for preg-robbing oxidation residue raw material in a leaching media identical to those shown in Table 1. FIG. 5 illustrates gold extraction rates obtained with and without re-sorptive materials. FIG. 3 shows that the gold recovery was only 0.5% without re-sorptive matter in leach, i.e. when carbon in chloride leach (CICL) was not used. By applying the CICL method, gold recovery increased up to 81%.

Example 5

Au extraction in gold leaching conditions. The chloride leaching conditions for gold was tested with a free-milling ore. Table 3 (test parameters) below and FIG. 5 (gold extraction) shows that gold recoveries comparable to cyanide leaching may be achieved in low chloride concentration in less stable solutions without bromide and only minor amount of cupric ions in the solution.

TABLE 3

Initial leaching test parameters for free-milling gold concentrate

| Test | Re-sorptive material | $Cu^{2+}$, g/L | $Fe^{3+}$, g/L | $Cl^-_{tot}$, g/L | NaBr, g/L | pH | t, h |
|---|---|---|---|---|---|---|---|
| 1 | CICL | 0.1 | 5 | 20 | — | 1 | 2 |
| 2 | CICL | 0 | 5 | 20 | — | 1 | 20 |
| 3 | CICL | 0.1 | 2 | 20 | — | 1 | 20 |
| 4 | CICL | 0 | 2 | 20 | — | 1 | 20 |

Example 6

Indicative leach test in mild environment with solution having low chloride concentration (Test 3 having [$Cu^{2+}$]=35 g/L, [$Cl^-$]=40 g/L, pH=2.6, T=98° C., t=40 h, oxygen feed) and seawater type solution (Test 4 having [$Cu^{2+}$]=17.5 g/L, [$Cl^-$]=20 g/L, pH<3, T=98° C., t=40 h, oxygen feed) and even milder solution (Test 5 having [$Cu^{2+}$]=9 g/L, [$Cl^-$]=10 g/L, pH<3, T=98° C., t=40 h, oxygen feed) was carried out in comparison to state of the art leaching with high chloride concentration (Tests 1 and 2). Redox during the experiment was <600 mV and even <500 vs. Ag/AgCl (FIG. 3) i.e. of the magnitude where gold is not considered stable in solution. It was surprisingly observed that with all tested mild solutions (Tests 3 to 5) gold recovery was >90%.

Figure 6:
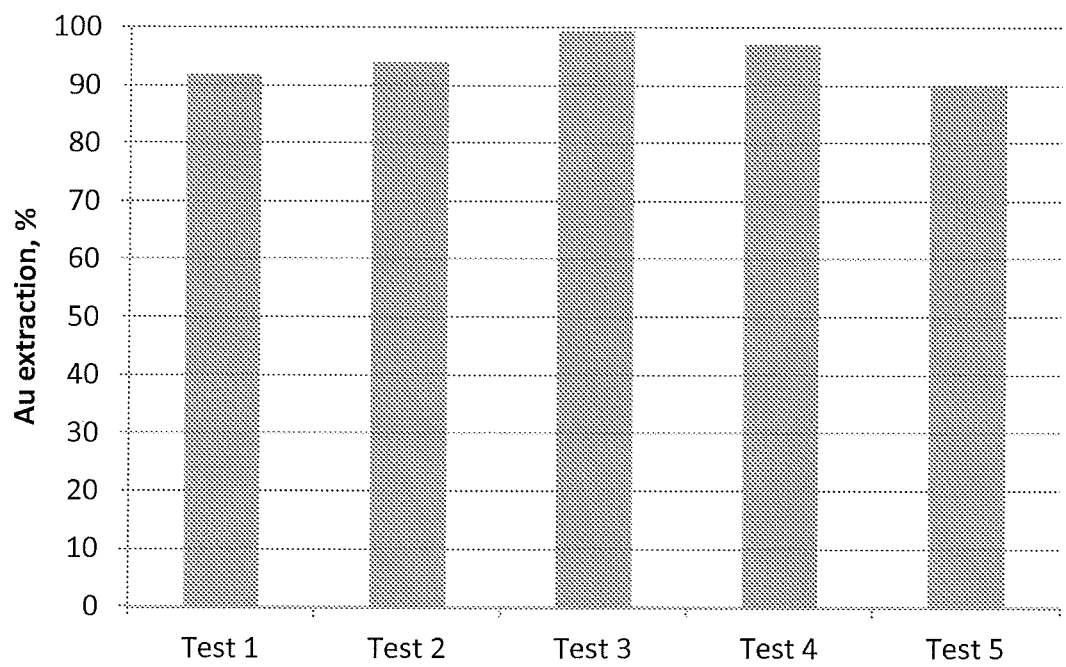
FIG. 6 illustrates recovery of gold (%) in different gold chloride processes.

FIG. 6 shows that 92% of gold could be leached in a prior art process with high halide concentration (Test 1). No carbon was present. Test with carbon in leach (Test 2), [Cu]=1 g/L, [$Cl^-$]=100 g/L) resulted in approximately 94% recovery. By applying the method of the present invention, Test 3 ([Cl]=40 g/L with 35 g/L $Cu^{2+}$) and Test 4 ([Cl]=20 g/L with 17.5 g/L $Cu^{2+}$) and Test 5 ([Cl]=10 g/L with 9 g/L $Cu^{2+}$) 99, 97 and 90% of gold could be leached, respectively.

Figure 7:
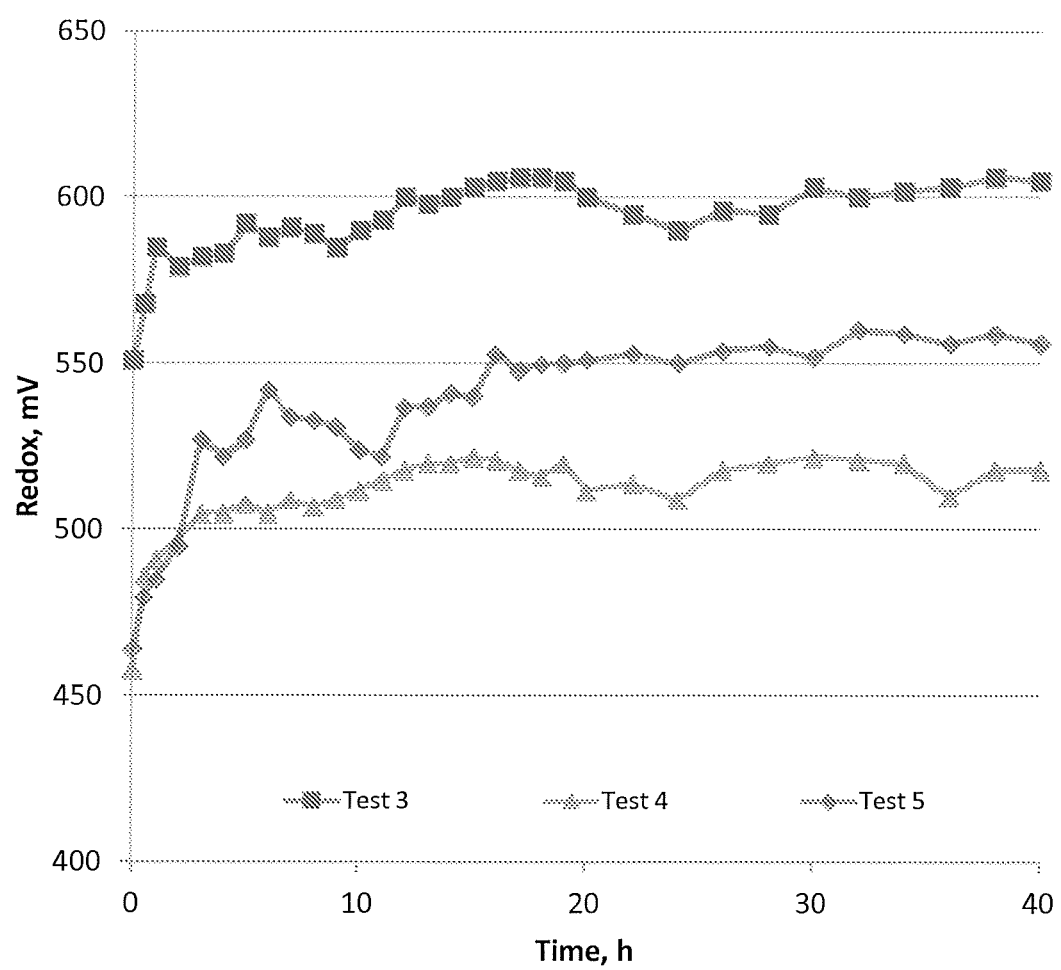
FIG. 7 illustrates redox potentials during alternative examples of the method of the present invention.

FIG. 7 shows that redox potential during leaching experiments. Specifically in Test 4 redox potential was very low, below 520 mV vs. Ag/AgCl. At such low potentials there are no chloride processes/laboratory studies that would have been reported gold chloride leaching being successful. Surprisingly, it was observed that at such low potentials gold can be dissolved in the presence of re-sorbent. As demonstrated with the method of the present invention gold can be dissolved at low REDOX using seawater or similar type of chloride containing synthetic aqueous solution.

Example 7

Au extraction in gold leaching conditions. The chloride leaching conditions for gold was tested with low chloride concentrations. Test parameters are provided in Table 4. No added bromide was present. The resides time in all tests was 20 h and leaching temperature was 98° C. The Table 4 further shows that reasonable gold recoveries may be achieved in low chloride concentrations.

TABLE 4

Initial leaching test parameters for free-milling gold concentrate

| Test | T [C] | pH | Fe g/L | $Fe^{3+}$ g/L | Cu g/L | Cl g/L | Act. carbon g/L | Gas mL/min | Extraction % | Recovery % |
|---|---|---|---|---|---|---|---|---|---|---|
| Ref | 98 | 1 | 1 | 0 | 91 | 200 | 20 | O2/500 | 70% | 70% |
| 1 | 98 | 1 | 5 | 1.5 | 0.1 | 20 | 20 | O2/500 | 48% | 48% |
| 2 | 98 | 1 | 7 | 2.2 | 0.0 | 20 | 20 | O2/500 | 48% | 48% |
| 3 | 98 | 1 | 5 | 1.3 | 0.0 | 20 | 20 | O2/500 | 44% | 44% |
| 4 | 98 | 1.5 | 4 | 0.4 | 0.0 | 20 | 20 | Air/500 | 40% | 40% |
| 5 | 98 | 2 | 2 | 0.1 | 0.0 | 20 | 20 | Air/500 | 39% | 39% |
| 8 | 98 | 1 | 18 | 13.9 | 18 | 1 | 20 | O2/1000 | 37% | 37% |

It will be obvious to a person skilled in the art that, as the technology advances, the inventive concept can be implemented in various ways. The invention and its embodiments are not limited to the examples described above but may vary within the scope of the claims.

The invention claimed is:

1. A process for recovery of gold from gold-bearing raw materials comprising (a) leaching said gold-bearing raw material in the presence of a re-sorptive material in an aqueous chloride containing leaching solution comprising a total concentration of 1 to 35 g/L of halide ions, whereby the total concentration of chloride ions is from 1 to 35 g/L, to dissolve gold and to obtain a first leach solution comprising gold in solution, wherein the temperature of the leaching step (a) is from 70 to 105°, and wherein the oxidation-reduction potential of the leaching solution in the leaching step (a) is at least 400 mV vs. Ag/AgCl; and simultaneously contacting the first leach solution comprising gold in solution with a re-sorptive material to obtain a second leach solution comprising gold-bearing re-sorptive material, wherein the re-sorptive material is selected from carbon comprising chemicals and materials; and (b) recovering gold and optionally silver from said gold-bearing re-sorptive material.

2. A process as claimed in claim 1, wherein in the chloride containing leaching solution a total concentration of bromide ions is less than 10 g/L, and a total concentration of cupric and/or ferric ions is at least 1 g/L.

3. A process as claimed in claim 1, wherein the chloride containing leaching solution comprises a total concentration from 1 to 20 g/L of halide ions, whereby the total concentration of chloride ions is from 1 to 20 g/L.

4. A process as claimed in claim 1, wherein the oxidation-reduction potential of the leaching solution is 400 mV to 750 mV vs. Ag/AgCl.

5. A process as claimed in claim 1, wherein a total concentration of dissolved cupric and/or ferric ions in the chloride containing leaching solution is at least 0.26 g/L.

6. A process as claimed in claim 1, wherein a total concentration of ferric ions in the chloride containing leaching solution is 0 g/L to 10 g/L.

7. A process as claimed in claim 1, wherein a total concentration of cupric ions in the chloride containing leaching solution is less than 20 g/L.

8. A process as claimed in claim 1, wherein the first leach solution contains iron and/or copper and the method comprises using oxygen-containing gas as oxidant for oxidizing iron and/or copper in the first leach solution.

9. A process as claimed in claim 1, wherein the gold-bearing raw material comprises preg-robbing material.

10. A process as claimed in claim 1, wherein the chloride containing leaching solution has a pH of less than 4.0.

11. A process as claimed in claim 1, wherein the leaching is carried out in the absence of bromide ions.

12. A process as claimed in claim 1, wherein the leaching is carried out in the absence of copper.

13. A process as claimed in claim 1, wherein the leaching is carried out in the absence of iron.

14. A process as claimed in claim 1, wherein the re-sorptive material is selected from the group consisting of activated carbon, resin, organic solvents, organic substances, inorganic carbon, rubber, plastics, biopolymers, and combinations thereof.

15. A process as claimed in claim 1, wherein the re-sorptive material comprises one or more of activated carbon, resin in leach, solvent in leach, organic substance, inorganic carbon, rubber, plastic, ion-exchange resin and polymeric resin.

16. A process as claimed in claim 1, wherein the method comprises removing excess water from the leach solution by one or more of evaporation, reverse osmosis, and other water removal technology.

* * * * *